(12) United States Patent
Liu et al.

(10) Patent No.: US 10,401,840 B2
(45) Date of Patent: Sep. 3, 2019

(54) METHOD AND SYSTEM FOR SCHEDULING PARALLEL PROCESSING MACHINES BASED ON HYBRID SHUFFLED FROG LEAPING ALGORITHM AND VARIABLE NEIGHBORHOOD SEARCH ALGORITHM

(71) Applicant: Hefei University of Technology, Hefei, Anhui (CN)

(72) Inventors: Xinbao Liu, Anhui (CN); Jun Pei, Anhui (CN); Min Kong, Anhui (CN); Shaojun Lu, Anhui (CN); Xiaofei Qian, Anhui (CN); Zhiping Zhou, Anhui (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 15/958,932

(22) Filed: Apr. 20, 2018

(65) Prior Publication Data
US 2018/0356802 A1 Dec. 13, 2018

(30) Foreign Application Priority Data
Jun. 12, 2017 (CN) .......................... 2017 1 0440182

(51) Int. Cl.
*G05B 19/418* (2006.01)
(52) U.S. Cl.
CPC ............... *G05B 19/41865* (2013.01); *G05B 2219/33081* (2013.01); *G05B 2219/34379* (2013.01)
(58) Field of Classification Search
CPC .... G05B 19/41865; G05B 2219/34379; G05B 2219/33081
See application file for complete search history.

(56) References Cited

U.S. PATENT DOCUMENTS

| | | | |
|---|---|---|---|
| 7,593,905 B2 * | 9/2009 | He | H04L 67/1002 706/13 |
| 2005/0097559 A1 * | 5/2005 | He | G06N 3/126 718/104 |

FOREIGN PATENT DOCUMENTS

| | | |
|---|---|---|
| CN | 103927689 A | 7/2014 |
| CN | 105320105 A | 2/2016 |

(Continued)

OTHER PUBLICATIONS

Wang Yamin, Pan Quanke, Ji Junzhong, et al. "Optimizing solution for solving no_idle permutation flow shop scheduling problem based on shuffled frog leaping algorithm". Computer Engineering and Applications, 2010, 46(17) 52-56.

(Continued)

*Primary Examiner* — Charles R Kasenge
(74) *Attorney, Agent, or Firm* — Wayne & Ken, LLC; Tony Hom (57) ABSTRACT

A method and a system for scheduling parallel machines based on hybrid shuffled frog leaping algorithm and variable neighborhood search algorithm are provided to solve collaborative production and processing of jobs on a plurality of unrelated batch processing machines. The jobs are distributed to machines based on the normal processing time and deterioration situation of the jobs on different machines and are arranged. An effective multi-machine heuristic rule is designed according to the structural properties of an optimal solution for the single-machine problem, and the improved rule is applied to the improved shuffled frog leaping algorithm to solve this problem. The improvement strategy for the traditional shuffled frog leaping algorithm is to improve the local search procedure of the traditional frog leaping algorithm by introducing the variable neighborhood (Continued)

search algorithm. The convergence rate and optimization capacity of the original algorithm are thus improved.

6 Claims, 2 Drawing Sheets

(56) References Cited

FOREIGN PATENT DOCUMENTS

| | | |
|---|---|---|
| CN | 105956689 A | 9/2016 |
| JP | 2010-157182 A | 7/2010 |

OTHER PUBLICATIONS

Pan Yuxia, Pan Quanke, Sang Hongyan. "Hybrid discrete shuffled frog-leaping algorithm for lot-streaming flowshop scheduling problem".

Dai Fu, Huang Wenming, Deng Zhenrong. "grid dag task scheduling based on an improved shuffled frog leaping algorithm".

* cited by examiner

METHOD AND SYSTEM FOR SCHEDULING PARALLEL PROCESSING MACHINES BASED ON HYBRID SHUFFLED FROG LEAPING ALGORITHM AND VARIABLE NEIGHBORHOOD SEARCH ALGORITHM

TECHNICAL FIELD

The present invention relates to the technical field of supply chains, and in particular to a method and a system for scheduling parallel processing machines based on shuffled frog leaping algorithm and variable neighborhood search algorithm.

BACKGROUND OF THE PRESENT INVENTION

Some solutions to the problem of scheduling jobs on batch processing machines have been proposed in the prior art, which will be described briefly below.

(1) Solution related to batch scheduling: Li, et al. conducted studies on problems of processing jobs on unrelated parallel-batching processing machines. Based on the complexity of the problems, they proposed a heuristic algorithm based on BFLPT to solve these problems.

Specifically, see *SCHEDULING UNRELATED PARALLEL BATCH PROCESSING MACHINES WITH NON-IDENTICAL JOB SIZES*, by Li X, Huang Y L, Tan Q, et al., Computers&Operations Research, 2013, 40(12):2983-2990.

(2) Solution related to job deterioration: Wang, et al. conducted studies on production scheduling problems in which the processing time of a kind of jobs increases nonlinearly with the processing start time. Based on the nature of the problems, they proposed an optimal algorithm and a heuristic algorithm to solve these problems.

Specifically see 2012. *SINGLE-MACHINE SCHEDULING WITH NONLINEARDETERIORATION*, by Wang, J., Wang, M., Optimization Letters 6, 87-98.

(3) Solution related to meta-heuristic algorithm: Eusuff, et al. proposed a shuffled frog leaping algorithm in 2003, which is inspired by a predation process of frogs in the natural world. This algorithm generally includes:

step 1: initializing a frog population;
step 2: dividing the entire population into several groups according to a fitness value of each individual;
step 3: performing local search on each group;
step 4: gathering scattered groups together; and
step 5: determining whether a termination condition is satisfied, if so, going to the step 2.

The advantage of this algorithm is that the set operation can enable each individual to perform certain information exchange at each iteration, and this enhances the optimization capacity of the algorithm.

Specifically see 2003. *OPTIMIZATION OF WATER DISTRIBUTION NETWORK DESIGN USING THE SHUFFLED FROG LEAPING ALGORITHM*, by Eusuff, M. M., Lansey, K. E., Journal of Water Resources Planning&Management 129, 210-225.

By studies on the related technologies, the inventors found that the time for a job is a determined value and the deterioration of the job is rarely considered during studies on the traditional batch scheduling. In addition, in the traditional shuffled frog leaping algorithm, the local search is similar to the particle migration strategy in the particle swarm algorithm, the convergence accuracy is low and easily plunges into the local optimum, and the discrete combinatorial optimization problem cannot be effectively solved. This leads to unreasonable scheduling.

SUMMARY OF THE PRESENT INVENTION

An objective for embodiments of the present invention is to improve the rationality of scheduling jobs on batch processing machines.

In a first aspect, the embodiments of the present invention provide a method for collaborative manufacturing of a plurality of unrelated parallel-batching processing machines based on hybrid shuffled frog leaping algorithm and variable neighborhood search algorithm, including:

step 1: inputting a normal processing time for each job on each machine, initializing algorithm parameters including a population size N, the number of divided groups S, the current number of iterations L, the maximum number of iterations of RVNS algorithm $U_{mar}$ and the maximum number of iterations $L_{max}$, and setting L=1;

step 2: initializing positions of all frogs in the population, which is denoted by $P^{(L)}=\{P_1^{(L)}, \ldots, P_i^{(L)}, \ldots, P_N^{(L)}\}$, where $P_i^{(L)}=\{P_{i1}^{(L)}, \ldots, P_{ij}^{(L)}, \ldots, P_{in}^{(L)}\}$ represents individual in the $L^{th}$ generation of population $P^{(L)}$, $P_{ij}^{(L)}$ represents a position of the individual $P_i^{(L)}$ in the $j^{th}$ dimension, and each position represents a corresponding job, i=1, 2, . . . N, j=1, 2, . . . n;

step 3: calculating a fitness value of each individual in the population $P^{(L)}$;

step 4: dividing the population into S groups in average according to the fitness value, with a set of groups denoted by $MEK^{(L)}=\{MEK_1^{(L)}, \ldots, MEK_s^{(L)}, \ldots, MEK_S^{(L)}\}$, where $MEK_s^{(L)}=\{MEK_{s1}^{(L)}, \ldots, MEK_{sl}^{(L)}, \ldots, MEK_{s(N/S)}^{(L)}\}$ represents the $s^{th}$ group in the set, $MEK_{sl}^{(L)}$ represents the $l^{th}$ individual in a group $MEK_s^{(L)}$, s=1, 2, . . . S, 1=1, 2, . . . (N/S), and setting s=1;

step 5: calculating the best and the worst individuals in the group $MEK_s^{(L)}$, which are denoted by $MEK_{sbest}^{(L)}$ and $MEKt_{sworst}^{(L)}$, respectively, randomly selecting one individual $MEK_s^{(L)}$ from the group $MEK_{sl}^{(L)}$ as an initial solution of the RVNS algorithm, and setting u=1;

step 6: determining whether $u \leq U_{niax}$ is satisfied, if so, going to a step 9;

step 7: randomly generating a first type of neighborhood individuals X_1 for one $MEK_{sl}^{(L)}$, determining whether X_1 is better than $MEK_{sl}^{(L)}$, if so, assigning X_1 to $MEK_{sl}^{(L)}$, assigning u+1 to u, and going to the step 5; if not, going to a step 8;

step 8: randomly generating a second type of neighborhood individuals X_2 for one $MEK_{sl}^{(L)}$, determining whether X_2 is better than $MEK_{sl}^{(L)}$, if so, assigning X_2 to $MEK_{sl}^{(L)}$, assigning u+1 to u, and going to the step 5; if not, going to a step 9;

step 9: randomly generating a third type of neighborhood individuals X_3 for one $MEK_{sl}^{(L)}$, determining whether X_3 is better than $MEK_s^{(L)}$, if so, assigning X_3 to $MEK_{sl}^{(L)}$, assigning u+1 to u, and going to the step 5; if not, going to a step 10;

step 10: determining whether $MEK_{sl}^{(L)}$ is better than $MEK_{sbest}^{(L)}$, if so, assigning $MEK_{sl}^{(L)}$ to $MEK_{sbest}^{(L)}$; if not, assigning $MEK_{sl}^{(L)}$ to $MEK_{sworst}^{(L)}$;

step 11: determining whether s is not greater than S, if so, assigning s+1 to s, and going to the step 5; and a step 12 of determining whether L is not greater than $L_{max}$, if so, assigning L+1 to L, and going to the step 3; if not, ending the algorithm, outputting an execution machine for each job as well as batches and batch processing sequences on each machine.

Optionally, in the step 3, calculating a fitness value of each individual in a population $P^{(L)}$ specifically includes:

step 31: designating an arrangement order of the jobs according to the position of the individual $P_i^{(L)}=\{P_{i1}^{(L)}, \ldots, P_{ij}^{(L)}, \ldots, P_{in}^{(L)}\}$, denoting the arrangement order of the jobs by $$\phi = \{J_{P_{i1}^{(L)}}, \ldots, J_{P_{ij}^{(L)}}, \ldots, J_{P_{in}^{(L)}}\},$$

and setting b=1;

step 32: grouping first C jobs in φ into a batch which is denoted by $B_b^{(L)}$ and deleting the first C jobs from φ, and setting k=1;

step 33: trying to put the batch $B_b^{(L)}$ on a machine $M_k$, and processing all current batches on the machine $M_k$, according to a non-descending order of a basic processing times for a batch, wherein the basic processing time for a batch is a maximum processing time of all the jobs in the batch without deterioration; and calculating a completion time for the last batch on the $M_k$ according to formula (1), which is denoted by $MC_{bk}^{(L)}$;

step 34: determining whether k is not greater than m, if so, assigning k+1 to k, and going to the step 3; if not, arranging $B_b^{(L)}$ onto the machine $M_{k*}$, where k*=arg min $\{MC_{bk}^{(L)} | k=1, 2, \ldots, m\}$;

step 35: determining whether b is equal to B, if so, outputting a current maximum completion time of a batch on all the machines as the fitness value of the individual $P^{(L)}$; if not, going to a step 36; and step 36: determining whether the number of the remaining jobs in φ is not greater than C, if so, assigning b+1 to b, grouping the remaining jobs into the batch $B_b^{(L)}$, and going to the step 33; if not, assigning b+1 to b and going to the step 32.

Optionally, in the step 7, randomly generating a first type of neighborhood individuals X_1 for one $MEK_{sl}^{(L)}$ specifically includes:

step 71: randomly generating a vector $A=\{A_1, \ldots, A_j, \ldots, A_n\}$ of a length n, all elements of which is valued from (0, 1), wherein there is a one-to-one correspondence between the elements of the vector A and elements of the individual $MEK_{sl}^{(L)}$;

step 72: reordering the position of the individual $MEK_{sl}^{(L)}$ according to a non-descending order of $A_j$; and step 73: denoting an individual generated by reordering as X_1.

Optionally, in the step 8, randomly generating a second type of neighborhood individuals X_2 of $M_{EKsl}^{(L)}$ specifically includes:

step 81: randomly selecting two positions of the individual $MEK_{sl}^{(L)}$ for exchange; and step 82: repeating the step 81 for several times to obtain the individual X_2.

Optionally, in the step 9, randomly generating a third type of neighborhood individuals X_3 for one $MEK_{sl}^{(L)}$ specifically includes:

step 91: randomly selecting two positions of the individual $MEK_{sl}^{(L)}$, and inserting a value of one of the positions before the position; and step 92: repeating the step 91 for several times to obtain the individual X_3.

In a second aspect, the embodiments of the present invention provide a system for collaborative manufacturing of a plurality of unrelated parallel-batching processing machines based on hybrid shuffled frog leaping algorithm and variable neighborhood search algorithm, including:

a calculation module used for:

step 1: inputting a normal processing time for each job on each machine, initializing algorithm parameters including a population size N, the number of divided groups S, the current number of iterations L, the maximum number of iterations of RVNS algorithm $U_{max}$ and the maximum number of iterations $L_{max}$, and setting L=1;

step 2: initializing positions of all frogs in the population which is denoted by $P^{(L)}=\{P_1^{(L)}, \ldots, P_i^{(L)}, \ldots, P_N^{(L)}\}$, where $P_i^{(L)}=\{P_{i1}^{(L)}, \ldots, P_{ij}^{(L)}, \ldots, P_{in}^{(L)}\}$ represents the $i^{th}$ individual in the $L^{th}$ generation of population $P^{(L)}$, $P_{ij}^{(L)}$ represents a position of the individual $P_i^{(L)}$ in the $j^{th}$ dimension, and each position represents a corresponding job, i=1, 2, ... N, j=1, 2, ... n;

step 3: calculating a fitness value of each individual in the population $P^{(L)}$;

step 4: dividing the population into S groups in average according to the fitness value, with a set of groups denoted by $MEK^{(L)}=\{MEK_1^{(L)}, \ldots, MEK_s^{(L)}, \ldots, MEK_S^{(L)}\}$, where $MEK_s^{(L)}=\{MEK_{s1}^{(L)}, \ldots, MEK_{sl}^{(L)}, \ldots, MEK_{s(N/S)}^{(L)}\}$ represents the $s^{th}$ group in the set, $MEK_{sl}^{(L)}$ represents the $l^{th}$ individual in a group $MEK_s^{(L)}$, s=1, 2, ... S, l=1, 2, ... (N/S), and setting s=1;

step 5: calculating the best and the worst individuals in the group $MEK_s^{(L)}$, which are denoted by $MEK_{sbest}^{(L)}$ and $MEK_{sworst}^{(L)}$, respectively, randomly selecting one individual $MEK_{sl}^{(L)}$ from the group $MEK_s^{(L)}$ as an initial solution of the RVNS algorithm, and setting u=1;

step 6: determining whether u≤$U_{max}$ is satisfied, if so, going to a step 9;

step 7: randomly generating a first type of neighborhood individuals X_1 for $MEK_{sl}^{(L)}$, determining whether X_1 is better than $MEK_{sl}^{(L)}$, if so, assigning X_1 to $MEK_{sl}^{(L)}$, assigning u+1 to u, and going to the step 5; if not, going to a step 8;

step 8: randomly generating a second type of neighborhood individuals X_2 for $MEK_{sl}^{(L)}$, determining whether X_2 is better than $MEK_{sl}^{(L)}$, if so, assigning X_2 to $MEK_{sl}^{(L)}$, assigning u+1 to u, and going to the step 5; if not, going to a step 9;

step 9: randomly generating a third type of neighborhood individuals X_3 for $MEK_{sl}^{(L)}$, determining whether X_3 is better than $MEK_{sl}^{(L)}$, if so, assigning X_3 to $MEK_{sl}^{(L)}$, assigning u+1 to u, and going to the step 5; if not, going to a step 10;

step 10: determining whether $MEK_{sl}^{(L)}$ is better than $MEK_{sbest}^{(L)}$, if so, assigning $MEK_{sl}^{(L)}$ to $MEK_{sbest}^{(L)}$; if not, assigning $MEK_{sl}^{(L)}$ to $MEK_{sworst}^{(L)}$; and step 11: determining whether s is not greater than S, if so, assigning s+1 to s, and going to the step 5; and an output module used for: step 12: determining whether L is not greater than $L_{max}$, if so, assigning L+1 to L, and going to the step 3; if not, ending the algorithm, outputting batches and processing sequences of the batches on an execution machine for each job and each machine.

In the embodiments of the present invention, to solve collaborative production and processing of jobs on a plurality of unrelated batch processing machines. The jobs are distributed to machines based on the normal processing time and deterioration situation of the jobs on different machines and are arranged according to batches and processing sequences for the jobs, thus minimizing the maximum completion time. An effective multi-machine heuristic rule is designed according to the structural properties of an optimal solution for the single-machine problem, and the improved rule is applied to the improved shuffled frog leaping algorithm to solve this problem. The improvement strategy for the traditional shuffled frog leaping algorithm is to improve the local search procedure of the traditional frog leaping algorithm by introducing the variable neighborhood search algorithm. The convergence rate and optimization capacity of the original algorithm are thus improved.

BRIEF DESCRIPTION OF THE DRAWINGS

Various other advantages and benefits will become apparent to a person of ordinary skill in the art by reading the following detailed description of the preferred embodiments. The drawings are only for the purpose of illustrating the preferred embodiments, but not for the purpose of limiting the present invention. Also, identical components are denoted by identical reference numbers throughout the drawings, in which.

DETAILED DESCRIPTION OF THE PRESENT INVENTION

The technical solution in the embodiments of the present invention will be clearly and completely described as below with reference to the accompanying drawings in the embodiments of the present invention. Obviously, the described embodiments are only a part of, not all of, the embodiments of the present invention. All other embodiments obtained by a person of ordinary skill in the art based on the embodiments of the present invention without paying any creative effort shall fall into the protection scope of the present invention.

Various embodiments of the present invention are mainly related to the collaborative production and processing of jobs on a plurality of unrelated batch processing machines. The processing machines involved are batch processing machines, wherein a plurality of jobs can be grouped into one batch and processed in batches, and the batch processing time is equal to the longest processing time for all jobs in this batch. In the present invention, the processing time for each job on each machine is different. In addition, due to factors such as machine aging and worker fatigue, the processing time of a job increases overtime, and there is a nonlinear function relationship between the processing time for the job and its start time. The industrial field to which the present invention relates mainly includes semiconductor manufacturing, metal processing, steel manufacturing, etc.

For ease of understanding, the problem to be solved by the method according to the embodiments of the present invention will be described by an embodiment. The collaborative production and processing of jobs on a plurality of unrelated batch processing machines is to minimize the makespan. The problem is described as follows: a set of tasks consisting of n jobs which need to be processed on m parallel-batching processing machines is provided. The jobs is denoted by $J=\{J_1, \ldots, J_j, \ldots, J_n\}$, and the size of each job is the same. The machines is denoted by $M=\{M_1, \ldots, M_k, \ldots, M_m\}$, and each batch processing machine has the same capacity denoted by C. A basic processing time matrix $\Omega$ is expressed by $|pn1\ pn2\ \ldots\ pnm|$.

The normal processing time for a job $J_j$ on a machine $M_k$ is denoted by $p_{jk}$, and the normal processing time is the basic processing time for the job when deterioration does not occur, where $j=1, 2 \ldots, n$, $k=1, 2 \ldots, m$.

The description is under the following assumption:

(1) all the jobs are compatible, a plurality of jobs can be processed in a same batch if the capacity constraints of the machine are satisfied, and the time for processing the batch is determined by the job with the longest processing time in the batch;

(2) due to the effect of job deterioration, the processing time for the job increases nonlinearly with its processing start time, wherein the calculation formula is shown in Formula (1):

$$p_{jk}^A = p_{jk}(\alpha + \beta t)^\lambda \quad (1)$$

where $p_{jk}^A$ is the actual processing time for the job $J_j$ on the machine $M_k$, t is the processing start time for the job $J_j$ on the machine $M_k$, $\alpha$, $\beta$ and $\lambda$ are constants, and $\alpha \geq 1$, $\lambda > 1$.

Figure 1:
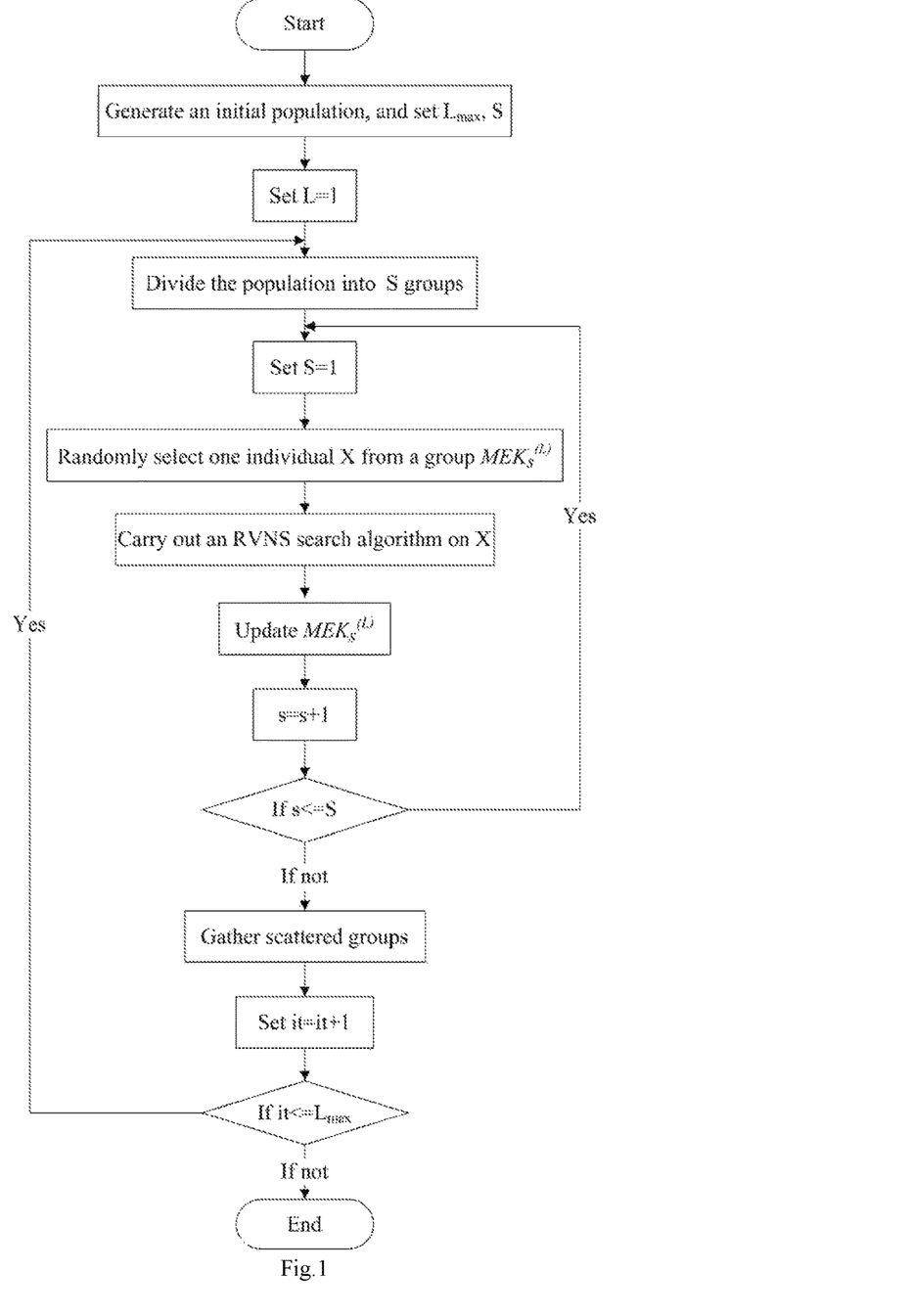
FIG. 1 is a schematic flowchart of a method for collaborative manufacturing of a plurality of unrelated parallel-batching processors based on hybrid shuffled frog leaping algorithm and variable neighborhood search algorithm according to one embodiment of the present invention.

On this basis, a method for collaborative manufacturing of a plurality of unrelated parallel-batching processing machines based on hybrid shuffled frog leaping algorithm and variable neighborhood search algorithm is provided by the embodiments of the present invention, with reference to FIG. 1, including:

step 1: inputting a normal processing time for each job on each machine, initializing algorithm parameters including a population size N, the number of divided groups S, the current number of iterations L, the maximum number of iterations of RVNS algorithm $U_{max}$ and the maximum number of iterations $L_{max}$, and setting $L=1$;

step 2: initializing positions of all frogs in the population which is denoted by $P^{(L)}=\{P_1^{(L)}, \ldots, P_i^{(L)}, \ldots, P_N^{(L)}\}$, where $P_i^{(L)}=\{P_{i1}^{(L)}, \ldots, P_{ij}^{(L)}, \ldots, P_{in}^{(L)}\}$ represents the $i^{th}$ individual in the $L^{th}$ generation of population $P^{(L)}$, $P_{ij}^{(L)}$ represents a position of the individual $P_i^{(L)}$ in the $j^{th}$ dimension, and each position represents a corresponding job, $i=1, 2, \ldots N$, $j=1, 2, \ldots n$;

step 3: calculating a fitness value of each individual in the population $P^{(L)}$;

step 4: dividing the population into S groups in average according to the fitness value, with a set of groups denoted by:

$$MEK^{(L)} = \{MEK_1^{(L)}, \ldots, MEK_s^{(L)}, \ldots, MEK_S^{(L)}\} \quad (2)$$

where $MEK_s^{(L)}=\{MEK_{s1}^{(L)}, \ldots, MEK_{sl}^{(L)}, \ldots, MEK_{s(N/S)}^{(L)}\}$ represents the $s^{th}$ group in the set, $MEK_{sl}^{(L)}$ represents the 1th individual in a group $MEK_s^{(L)}$, $s=1, 2, \ldots S$, $l=1, 2, \ldots (N/S)$, and setting $s=1$;

step 5: calculating the best and the worst individuals in the group $MEK_s^{(L)}$, which are denoted by $MEK_{sbest}^{(L)}$ and $MEK_{sworst}^{(L)}$, respectively, randomly selecting one individual $MEK_{sl}^{(L)}$ from the group $MEK_{sl}^{(L)}$ as an initial solution of the RVNS algorithm, and setting $u=1$;

step 6: determining whether $u \leq U_{max}$ is satisfied, if so, going to a step 9;

step 7: randomly generating a first type of neighborhood individuals X_1 for one $MEK_{sl}^{(L)}$, determining whether X_1 is better than $MEK_{sl}^{(L)}$, if so, assigning X_1 to $MEK_{sl}^{(L)}$, assigning u+1 to u, and going to the step 5; if not, going to a step 8;

step 8: randomly generating a second type of neighborhood individuals X_2 for one $MEK_{sl}^{(L)}$, determining whether X_2 is better than $MEK_{sl}^{(L)}$, if so, assigning X_2 to $MEK_{sl}^{(L)}$, assigning u+1 to u, and going to the step 5; if not, going to a step 9;

step 9: randomly generating a third type of neighborhood individuals X_3 for one $MEK_{sl}^{(L)}$, determining whether X_3 is better than $MEK_{sl}^{(L)}$, if so, assigning X_3 to $MEK_{sl}^{(L)}$, assigning u+1 to u, and going to the step 5; if not, going to a step 10;

step 10: determining whether $MEK_{sl}^{(L)}$ is better than $MEK_{sbest}^{(L)}$ if so, assigning $MEK_{sl}^{(L)}$ to $MEK_{sbest}^{(L)}$; if not, assigning $MEK_{sl}^{(L)}$ to $MEK_{sworst}^{(L)}$;

step 11: determining whether s is not greater than S, if so, assigning s+1 to s, and going to the step 5; and a step 12 of determining whether L is not greater than $L_{max}$, if so, assigning L+1 to L, and going to the step 3; if not, ending the algorithm, outputting an execution machine for each job as well as batches and batch processing sequences on each machine.

In a specific implementation, calculating a fitness value of each individual in a population $P^{(L)}$ in the step 3 may be implemented in various embodiments, where an optional embodiment includes:

step 31: designating an arrangement order of the jobs according to the position of the individual $P_i^{(L)}=\{P_{i1}^{(L)}, \ldots, P_{ij}^{(L)}, \ldots, P_{in}^{(L)}\}$, denoting the arrangement order of the jobs as $$\phi = \left\{ J_{P_{i1}^{(L)}}, \ldots, J_{P_{ij}^{(L)}}, \ldots, J_{P_{in}^{(L)}} \right\},$$

and setting b=1;

step 32: grouping first C jobs in φ into a batch which is denoted by $B_b^{(L)}$ and deleting the first C jobs from φ, and setting k=1;

step 33: trying to put the batch $B_b^{(L)}$ on a machine $M_k$, and processing all current batches on the machine $M_k$ according to a non-descending order of a basic processing time for a batch, wherein the basic processing time for a batch is a maximum processing time of all the jobs in the batch without deterioration; and calculating a completion time for the last batch on the Mk according to formula (1), which is denoted by $MC_{bk}^{(L)}$;

step 34: determining whether k is not greater than m, if so, assigning k+1 to k, and going to the step 3; if not, arranging $B_b^{(L)}$ onto the machine $M_{k*}$, where k*=arg min $\{MC_{bk}^{(L)} | k=1, 2, \ldots, m\}$;

step 35: determining whether b is equal to B, if so, outputting a current maximum completion time for a batch on all the machines as the fitness value of the individual $P^{(L)}$; if not, going to a step 36; and step 36: determining whether the number of the remaining jobs in p is not greater than C, if so, assigning b+1 to b, grouping the remaining jobs into the batch $B_b^{(L)}$, and going to the step 33; if not, assigning b+1 to b and going to the step 32.

In a specific implementation, randomly generating a first type of neighborhood individuals X_1 for one $MEK_{sl}^{(L)}$ in the step 7 may be implemented in various embodiments, where an optional embodiment includes:

step 71: randomly generating a vector $A=\{A_1, \ldots, A_j, \ldots, A_n\}$ of a length n, all elements of which is valued from (0, 1), where there is a one-to-one correspondence between the elements of the vector A and elements of the individual $MEK_{sl}^{(L)}$;

step 72: reordering the position of the individual $MEK_{sl}^{(L)}$ according to a non-descending order of $A_j$; and step 73: denoting an individual generated by reordering as X_1.

In a specific implementation, randomly generating a second type of neighborhood individuals X_2 of $MEK_{sl}^{(L)}$ in the step 8 may be implemented in various embodiments, where an optional embodiment includes:

step 81: randomly selecting two positions of the individual $MEK_{sl}^{(L)}$ for exchange; and step 82: repeating the step 1 for several times to obtain the individual X_2.

In a specific implementation, randomly generating a third type of neighborhood individuals X_3 of $MEK_{sl}^{(L)}$ in the step 9 may be implemented in various embodiments, where an optional embodiment includes:

a step 91 of randomly selecting two positions of the individual $MEK_{sl}^{(L)}$, and inserting a value of one of the positions before the position; and step 92: repeating the step 1 for several times to obtain the individual X_3.

In the method for collaborative manufacturing of a plurality of unrelated parallel-batching processing machines based on hybrid shuffled frog leaping algorithm and variable neighborhood search algorithm provided by the embodiments of the present invention, to solve the collaborative production and processing of jobs on a plurality of unrelated batch processing machines, a meta-heuristic algorithm is designed for the hybrid shuffled frog leaping algorithm and variable neighborhood search algorithm, including the following steps of: firstly, encoding to determine a sequence of jobs, and then proposing a corresponding batching strategy and a batch scheduling heuristic algorithm according to the nature of the problem to obtain a fitness value of a corresponding individual; secondly, introducing a variable neighborhood search algorithm as a local search process of the original frog leaping algorithm. This improves the solution quality, accelerates the convergence speed of the algorithm, achieves continuous renewal of the population through repeated iterations, and finally obtains an optimal solution.

Moreover, the method according to the embodiment of the present invention designs three kinds of effective neighborhood structures in the variable neighborhood search algorithm, including a neighborhood structure based on a random key concept, a neighborhood structure based on multi-exchange and a neighborhood structure based on multi-insertion. These three neighborhood structures take into account the requirements of the algorithm in terms of population diversity, randomness and accelerating convergence, avoiding the algorithm plunging into the local optimum and improving the search depth and breadth of the algorithm.

Figure 2:
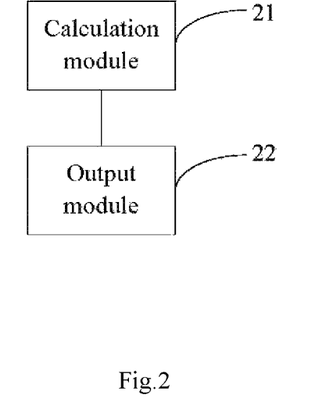
FIG. 2 is a schematic diagram of a system for collaborative manufacturing of a plurality of unrelated parallel-batching processors based on hybrid shuffled frog leaping algorithm and variable neighborhood search algorithm according to one embodiment of the present invention.

Based on the same concept, another embodiment of the present invention further provides a system for collaborative manufacturing of a plurality of irrelevant parallel-batching processing machines based on hybrid shuffled frog leaping algorithm and variable neighborhood search algorithm, with reference to FIG. 2, including:

a calculation module 21 used for:

step 1: inputting a normal processing time for each job on each machine, initializing algorithm parameters including a population size N, the number of divided groups S, the current number of iterations L, the maximum number of iterations of RVNS algorithm $U_{max}$ and the maximum number of iterations $L_{max}$, and setting L=1;

step 2: initializing positions of all frogs in the population which is denoted by $P^{(L)}=\{P_1^{(L)}, \ldots, P_i^{(L)}, \ldots, P_N^{(L)}\}$, where $P_i^{(L)} = \{P_{i1}^{(L)}, \ldots, P_{ij}^{(L)}, \ldots, P_{in}^{(L)}\}$ represents the individual in the $L^{th}$ generation of population $P^{(L)}$, $P_{ij}^{(L)}$ represents a position of the individual $P_i^{(L)}$ in the $j^{th}$ dimension, and each position represents a corresponding job, $i=1, 2, \ldots N$, $j=1, 2, \ldots n$;

step 3: calculating a fitness value of each individual in the population $P^{(L)}$;

step 4: dividing the population into S groups in average according to the fitness value, with a set of groups denoted by:

$$MEK^{(L)} = \{MEK_1^{(L)}, \ldots, MEK_s^{(L)}, \ldots, MEK_S^{(L)}\} \qquad (3)$$

where $MEK_s^{(L)} = \{MEK_{s1}^{(L)}, \ldots, MEK_{sl}^{(L)}, \ldots, MEK_{s(N/S)}^{(L)}\}$ represents the $s^{th}$ group in the set, $MEK_{sl}^{(L)}$ represents the $l^{th}$ individual in a group $MEK_s^{(L)}$, $s=1, 2, \ldots S$, $l=1, 2, \ldots (N/S)$, and setting $s=1$;

step 5: calculating the best and the worst individuals in the group $MEK_s^{(L)}$, which are denoted by $MEK_{sbest}^{(L)}$ and $MEK_{sworst}^{(L)}$, respectively, randomly selecting one individual $MEK_s^{(L)}$ from the group $MEK_{sl}^{(L)}$ as an initial solution of the RVNS algorithm, and setting $u=1$;

step 6: determining whether $u \leq U_{max}$ is satisfied, if so, going to a step 9;

step 7: randomly generating a first type of neighborhood individuals X_1 for one $MEK_{sl}^{(L)}$, determining whether X_1 is better than $MEK_{sl}^{(L)}$, if so, assigning X_1 to $MEK_{sl}^{(L)}$, assigning u+1 to u, and going to the step 5; if not, going to a step 8;

step 8: randomly generating a second type of neighborhood individuals X_2 for one $MEK_{sl}^{(L)}$, determining whether X_2 is better than $MEK_{sl}^{(L)}$, if so, assigning X_2 to $MEK_{sl}^{(L)}$, assigning u+1 to u, and going to the step 5; if not, going to a step 9;

step 9: randomly generating a third type of neighborhood individuals X_3 for one $MEK_{sl}^{(L)}$, determining whether X_3 is better than $MEK_{sl}^{(L)}$, if so, assigning X_3 to $MEK_{sl}^{(L)}$, assigning u+1 to u, and going to the step 5; if not, going to a step 10;

step 10: determining whether $MEK_{sl}^{(L)}$ is better than $MEK_{sl}^{(L)}$, if so, assigning $MEK_{sl}^{(L)}$ to $MEK_{sbest}^{(L)}$; if not, assigning $MEK_{sl}^{(L)}$ to $MEK)_{sworst}^{(L)}$;

step 11: determining whether s is not greater than S, if so, assigning s+1 to s, and going to the step 5; and an output module 22 used for: step 12 of determining whether L is not greater than $L_{max}$, if so, assigning L+1 to L, and going to the step 3; if not, ending the algorithm, outputting batches and processing sequences of the batches on an execution machine for each job and each machine.

Optionally, the calculation module 21 is configured to execute the step 7 of randomly generating a first type of neighborhood individuals X_1 of $MEK_{sl}^{(L)}$, specifically including:

step 71: randomly generating a vector $A = \{A_1, \ldots, A_j, \ldots, A_n\}$ of a length n, all elements of which is valued from (0, 1), where there is a one-to-one correspondence between the elements of the vector A and elements of the individual $MEK_{sl}^{(L)}$;

step 72: reordering the position of the individual $MEK_{sl}^{(L)}$ according to a non-descending order of $A_j$; and step 73: denoting an individual generated by reordering as X_1.

Optionally, the calculation module 21 is configured to execute the step 8 of randomly generating a second type of neighborhood individuals X_2 of $MEK_{sl}^{(L)}$, specifically including:

step 81: randomly selecting two positions of the individual $MEK_{sl}^{(L)}$ for exchange; and step 82: repeating the step 1 for several times to obtain the individual X_2.

Optionally, the calculation module 21 is configured to execute the step 9 of randomly generating a third type of neighborhood individuals X_3 of $MEK_{sl}^{(L)}$, specifically including:

step 91: randomly selecting two positions of the individual $MEK_{sl}^{(L)}$, and inserting a value of one of the positions before the position; and step 92: repeating the step 1 for several times to obtain the individual X_3.

In the system for collaborative manufacturing of a plurality of irrelevant parallel-batching processing machines based on hybrid shuffled frog leaping algorithm and variable neighborhood search algorithm according to one embodiment of the present invention, to solve the collaborative production and processing of jobs on a plurality of unrelated batch processing machines, the jobs are distributed to machines based on the normal processing time and deterioration situation of the jobs on different machines and are arranged according to batches and processing sequences for the jobs, thus minimizing the maximum completion time. An effective multi-machine heuristic rule is designed according to the structural properties of an optimal solution for the single-machine problem, and the improved rule is applied to the improved shuffled frog leaping algorithm to solve this problem. The improvement strategy for the traditional shuffled frog leaping algorithm is to improve the local search procedure of the traditional frog leaping algorithm by introducing the variable neighborhood search algorithm. The convergence rate and optimization capacity of the original algorithm are thus improved.

The embodiments of the present invention further disclose a computer program product which includes stored computer programs. The computer programs include program instructions that, when executed by a computer, enable the computer to execute the method according to the above method embodiments, for example, the method described in the first aspect.

A lot of specific details have been described in the specification provided herein. However, it can be appreciated that the embodiments of the present invention may be practiced without these specific details. In some examples, well-known methods, structures and techniques have not been shown in detail so as not to obscure the understanding to this specification.

Similarly, it should be appreciated that in the above description of exemplary embodiments of the present invention, various features of the present invention are sometimes combined together in a single embodiment, figure, or description thereof for the purpose of streamlining the disclosure and aiding in the understanding of one or more of the various inventive aspects. However, the method of the disclosure is not to be interpreted as reflecting an intention that the claimed embodiments of the invention require more features than those expressly recited in each claim. Rather, as reflected by the following claims, inventive aspects are less than all features of a single foregoing embodiment. Thus, the claims following the specific implementation mode are hereby expressly incorporated herein just as each claim itself is a separate embodiment of the present invention.

What is claimed is:

1. A method for collaborative manufacturing of a plurality of unrelated parallel-batching processing machines based on hybrid shuffled frog leaping algorithm and variable neighborhood search algorithm, comprising:

step 1: inputting a normal processing time for each job on each machine, initializing algorithm parameters including a population size N, the number of divided groups S, the current number of iterations L, the maximum number of iterations of RVNS algorithm $U_{max}$ and the maximum number of iterations $L_{max}$, and setting L=1;

step 2: initializing positions of all frogs in a population which is denoted by $P^{(L)}=\{P_1^{(L)}, \ldots, P_i^{(L)}, \ldots, P_N^{(L)}\}$, where $P_i^{(L)}=\{P_{i1}^{(L)}, \ldots, P_{ij}^{(L)}, \ldots, P_{in}^{(L)}\}$ represents the $i^{th}$ individual in the $L^{th}$ generation of population $P^{(L)}$, $P_{ij}^{(L)}$ represents a position of the individual $P_i^{(L)}$ in the $j^{th}$ dimension, the $j^{th}$ position corresponds to the job $J_j$, i=1, 2, ... N, j=1, 2, ... n, and n represents the number of jobs;

step 3: calculating a fitness value of each individual in the population $P^{(L)}$;

step 4: dividing the population into S groups in average according to the fitness value, with a set of groups denoted by $MEK^{(L)}=\{MEK_1^{(L)}, \ldots, MEK_s^{(L)}, \ldots, MEK_S^{(L)}\}$, where $MEK_s^{(L)}=\{MEK_{s1}^{(L)}, \ldots, MEK_{sl}^{(L)}, \ldots, MEK_{s(N/S)}^{(L)}\}$ represents the $s^{th}$ group in the set, $MEK_{sl}^{(L)}$ represents the $l^{th}$ individual in a group $MEK_s^{(L)}$, s=1, 2, ... S, l=1, 2, ... (N/S), and setting s=1;

step 5: calculating the best and the worst individuals in the group $MEK_s^{(L)}$, which are denoted by $MEK_{sbest}^{(L)}$ and $MEK_{sworst}^{(L)}$ respectively, randomly selecting one individual $MEK_{sl}^{(L)}$ from the group $MEK_s^{(L)}$ as an initial solution of the RVNS algorithm, and setting u=1;

step 6: determining whether u≤$U_{max}$ is satisfied, if so, going to a step 9;

step 7: randomly generating a first type of neighborhood individuals X_1 for one $MEK_{sl}^{(L)}$, determining whether X_1 is better than $MEK_{sl}^{(L)}$, if so, assigning X_1 to $MEK_{sl}^{(L)}$, assigning u+1 to u, and going to the step 5; if not, going to a step 8;

step 8: randomly generating a second type of neighborhood individuals X_2 for one $MEK_{sl}^{(L)}$, determining whether X_2 is better than $MEK_{sl}^{(L)}$, if so, assigning X_2 to $MEK_{sl}^{(L)}$, assigning u+1 to u, and going to the step 5; if not, going to a step 9;

step 9: randomly generating a third type of neighborhood individuals X_3 for one $MEK_{sl}^{(L)}$, determining whether X_3 is better than $MEK_{sl}^{(L)}$, if so, assigning X_3 to $MEK_{sl}^{(L)}$, assigning u+1 to u, and going to the step 5; if not, going to a step 10;

step 10: determining whether $MEK_{sl}^{(L)}$ is better than $MEK_{sbest}^{(L)}$, if so, assigning $MEK_{sl}^{(L)}$ to $MEK_{sbest}^{(L)}$; if not, assigning $MEK_{sl}^{(L)}$ to $MEK_{sworst}^{(L)}$;

step 11: determining whether s is not greater than S, if so, assigning s+1 to s, and going to the step 5; and step 12: determining whether L is not greater than $L_{max}$, if so, assigning L+1 to L, and going to the step 3; if not, ending the algorithm, distributing the jobs to the machines and arranging batches and batch processing sequences on each machine.

2. The method according to claim 1, wherein, in the step 3, calculating a fitness value of each individual in a population $P^{(L)}$ specifically comprises:

step 31: designating an arrangement order of the jobs according to the position of the individual $P_i^{(L)}=\{P_{i1}^{(L)}, \ldots, P_{ij}^{(L)}, \ldots, P_{in}^{(L)}\}$, denoting the arrangement order of the jobs by $$\phi = \{J_{P_{i1}^{(L)}}, \ldots, J_{P_{ij}^{(L)}}, \ldots, J_{P_{in}^{(L)}}\},$$

and setting b=1;

step 32: grouping first C jobs in φ into a batch which is denoted by $B_b^{(L)}$ and deleting the first C jobs from φ, and setting k=1;

step 33: trying to put the batch $B_b^{(L)}$ on a machine $M_k$, and processing all current batches on the machine $M_k$ according to a non-descending order of a basic processing time for a batch, wherein the basic processing time for a batch is a maximum processing time for all the jobs in the batch without deterioration; and calculating a completion time for the last batch on the $M_k$ according to $p_{jk}^A = p_{jk}(\alpha+\beta t)^\lambda$, which is denoted by $MC_{bk}^{(L)}$; the normal processing time for the the job $J_j$ on the machine $M_k$ is denoted by $p_{jk}$, and the normal processing time is the basic processing time for the job when deterioration does not occur; where $p_{jk}^A$ is the actual processing time for the job $J_j$ on the machine $M_k$, α, β and λ are constants, t is the processing start time for the job $J_j$ on the machine $M_k$; where j=1, 2 ..., n, and k=1, 2 ..., m;

step 34: determining whether k is not greater than m, if so, assigning k+1 to k, and going to the step 3; if not, arranging $B_b^{(L)}$ onto the machine $M_{k*}$, where k*=arg min $\{MC_{bk}^{(L)}|k=1, 2, \ldots, m\}$;

step 35: determining whether b is equal to B, if so, outputting a current maximum completion time for a batch on all the machines as the fitness value of the individual $P^{(L)}$; if not, going to a step 36, and B represents the number of batches; and step 36: determining whether the number of the remaining jobs in φ, is not greater than C, if so, assigning b+1 to b, grouping the remaining jobs into the batch $B_b^{(L)}$, and going to the step 33; if not, assigning b+1 to b and going to the step 32.

3. The method according to claim 1, wherein, in the step 7, randomly generating a first type of neighborhood individuals X_1 for one $MEK_{sl}^{(L)}$ specifically comprises:

step 71: randomly generating a vector $A=\{A_1, \ldots, A_j, \ldots, A_n\}$ of a length n, all elements of which is valued from (0, 1), wherein there is a one-to-one correspondence between the elements of the vector A and elements of the individual $MEK_{sl}^{(L)}$;

step 72: reordering the position of the individual $MEK_{sl}^{(L)}$ according to a non-descending order of $A_j$; and step 73: denoting an individual generated by reordering as X_1.

4. The method according to claim 1, wherein, in the step 8, randomly generating a second type of neighborhood individuals X_2 of $MEK_{sl}^{(L)}$ specifically comprises:

step 81: randomly selecting two positions of the individual $MEK_{sl}^{(L)}$ for exchange; and step 82: repeating the step 81 for several times to obtain the individual X_2.

5. The method according to claim 1, wherein, in the step 9, randomly generating a third type of neighborhood individuals X_3 for one $MEK_{sl}^{(L)}$ specifically comprises:

step 91: randomly selecting two positions of the individual $MEK_{sl}^{(L)}$, and inserting a value of one of the positions before the position; and step 92: repeating the step 91 for several times to obtain the individual X_3.

6. A system for collaborative manufacturing of a plurality of unrelated parallel-batching processing machines based on hybrid shuffled frog leaping algorithm and variable neighborhood search algorithm, comprising:

one or more processors; and memory having instructions stored thereon, wherein the instructions, when executed by the one or more processors, cause the one or more processors to perform operations comprising:

step 1: inputting a normal processing time for each job on each machine, initializing algorithm parameters including a population size N, the number of divided groups S, the current number of iterations L, the maximum number of iterations of RVNS algorithm $U_{max}$ and the maximum number of iterations $L_{max}$, and setting L=1;

step 2: initializing positions of all frogs in the population which is denoted by $P^{(L)} = \{P_1^{(L)}, \ldots, P_i^{(L)}, \ldots, P_N^{(L)}\}$, where $P_i^{(L)} = \{P_{i1}^{(L)}, \ldots, P_{ij}^{(L)}, \ldots, P_{in}^{(L)}\}$ represents the $i^{th}$ individual in the $L^{th}$ generation of a population $P^{(L)}$, $P_{ij}^{(L)}$ represents a position of the individual $P_i^{(L)}$ in the $j^{th}$ dimension, the $j^{th}$ position corresponds to the job $J_j$, i=1, 2, ... N, j=1, 2, ... n, and n represents the number of jobs;

step 3: calculating a fitness value of each individual in the population $P^{(L)}$;

step 4: dividing the population into S groups in average according to the fitness value, with a set of groups denoted by $MEK^{(L)} = \{MEK_1^{(L)}, \ldots, MEK_s^{(L)}, \ldots, MEK_S^{(L)}\}$, where $MEK_s^{(L)} = \{MEK_{s1}^{(L)}, \ldots, MEK_{sl}^{(L)}, \ldots, MEK_{s(N/S)}^{(L)}\}$ represents the $s^{th}$ group in the set, $MEK_{sl}^{(L)}$ represents the $l^h$ individual in a group $MEK_s^{(L)}$, s=1, 2, ... S, l=1, 2, ... (N/S), and setting s=1;

step 5: calculating the best and the worst individuals in the group $MEK_s^{(L)}$, which are denoted by $MEK_{sbest}^{(L)}$ and $MEK_{sworst}^{(L)}$, respectively, randomly selecting one individual $MEK_s^{(L)}$ in the group $MEK_{sl}^{(L)}$ as an initial solution of the RVNS algorithm, and setting u=1;

step 6: determining whether $u \leq U_{max}$ is satisfied, if so, going to a step 9;

step 7: randomly generating a first type of neighborhood individuals X_1 for $MEK_{sl}^{(L)}$, determining whether X_1 is better than $MEK_{sl}^{(L)}$, if so, assigning X_1 to $MEK_{sl}^{(L)}$, assigning u+1 to u, and going to the step 5; if not, going to a step 8;

step 8: randomly generating a second type of neighborhood individuals X_2 for $MEK_{sl}^{(L)}$, determining whether X_2 is better than $MEK_{sl}^{(L)}$, if so, assigning X_2 to $MEK_{sl}^{(L)}$, assigning u+1 to u, and going to the step 5; if not, going to a step 9;

step 9: randomly generating a third type of neighborhood individuals X_3 for one $MEK_{sl}^{(L)}$, determining whether X_3 is better than $MEK_{sl}^{(L)}$, if so, assigning X_3 to $MEK_{sl}^{(L)}$, assigning u+1 to u, and going to the step 5; if not, going to a step 10;

step 10: determining whether $MEK_{sl}^{(L)}$ is better than $MEK_{sbest}^{(L)}$, if so, assigning $MEK_{sl}^{(L)}$ to $MEK_{sbest}^{(L)}$; if not, assigning $MEK_{sl}^{(L)}$ to $MEK_{sworst}^{(L)}$; and step 11: determining whether s is not greater than S, if so, assigning s+1 to s, and going to the step 5; and step 12: determining whether L is not greater than Lmax, if so, assigning L+1 to L, and going to the step 3; if not, ending the algorithm, distributing the jobs to the machines and arranging batches and batch processing sequences on each machine.

* * * * *